United States Patent [19]

Harris et al.

[11] 4,407,727
[45] Oct. 4, 1983

[54] METHOD OF SUPPORTING A CATALYST ON POLYOLEFINS

[75] Inventors: James J. Harris; Donald E. Hostetler, both of West Chester, Pa.

[73] Assignee: Atlantic Richfield Company, Los Angeles, Calif.

[21] Appl. No.: 433,566

[22] Filed: Oct. 8, 1982

[51] Int. Cl.³ .................................................. C08F 4/02
[52] U.S. Cl. ...................................... 502/115; 526/137; 526/138; 526/142; 526/127; 526/159; 526/169; 502/171
[58] Field of Search ............ 252/429 B, 431 R, 431 C

[56] References Cited

U.S. PATENT DOCUMENTS

| | | | |
|---|---|---|---|
| 3,594,330 | 7/1971 | Delbouille et al. | 252/429 |
| 4,098,979 | 7/1978 | Maemoto et al. | 526/100 |
| 4,130,699 | 12/1978 | Hoff et al. | 252/429 B X |
| 4,135,046 | 1/1979 | Harris et al. | 252/429 B X |
| 4,136,058 | 1/1979 | Harris et al. | 252/429 B |

FOREIGN PATENT DOCUMENTS 1436426  5/1976  United Kingdom .

Primary Examiner—Patrick Garvin
Attorney, Agent, or Firm—Lewis J. Young

[57] ABSTRACT

A process is provided for transforming a polyolefin powder into a suitable substrate for the preparation of transition metal catalysts. A powder polyolefin such as polyethylene or polypropylene is treated with a solution of a magnesium alkyl. The solvent is removed by any suitable procedure such as vacuum drying. The powder is then treated with gaseous HCl or other agent suitable for decomposition of the magnesium alkyl. The powder thus prepared is an effective support for preparing high efficiency catalysts such as taught in U.S. Pat. No. 4,136,058. These catalysts give polymers of increased particle size. Polyolefin powder in the absence of such treatment is not effective as a catalyst support and will not give polymers of increased particle size.

4 Claims, No Drawings

METHOD OF SUPPORTING A CATALYST ON POLYOLEFINS

BACKGROUND OF THE INVENTION

The invention relates to the field of supported catalysts for the polymerization of ethylene and the copolymerization of ethylene with other alpha-olefins.

The catalysts useful in the present invention are based on unsupported catalysts described and claimed by Harris et al in U.S. Pat. No. 4,136,058. These catalysts were made by reducing transition metal compounds with an organomagnesium compound followed by deactivation of the excess organomagnesium compound with a deactivation agent, such as hydrogen chloride.

Delbouille et al, in U.S. Pat. No. 3,594,330 teach that certain violet titanium trichloride containing catalysts can be supported on various pulverulent supports. The supports suggested include the polyolefins which were particularly suitable if sufficiently porous. The catalysts were prepared by adsorbing tetravalent titanium onto the polyolefin and then reducing the titanium with an alkyl aluminum compound.

Maemoto et al, in U.S. Pat. No. 4,098,979 teach the use of a high molecular compound as a carrier for a vanadium oxide catalyst with an alkyl aluminum compound.

British Pat. No. 1,436,426 to Stamicarbon B.V., teaches to support a catalyst of a tetravalent titanium compound and/or a vanadium compound on a polyethylene carrier.

SUMMARY OF THE INVENTION

Preparation of the catalysts of this invention in the presence of untreated polyolefin powder gives a catalyst which is the same as that made in the absence of the polyolefin. We have now found that pretreatment of the polyolefin with an alkylmagnesium compound and a deactivation agent therefore allows the preparation of a supported catalyst which polymerizes ethylene to a product having greatly reduced fines in higher yields.

DETAILED DESCRIPTION

The catalysts of Harris et al, U.S. Pat. No. 4,136,058, can be used to give increased yields and uniform particle size polyolefins when supported by polyolefin powders. Proper selection of the initial polyolefin support with regard to particle size and particle size distribution makes possible the production of polyolefin of a wide range of product particle size.

Unfortunately, merely making up the catalysts of Harris et al in the presence of polyethylene or polypropylene powder does not give a supported catalyst. Rather, the product is a mixture of polyolefin powder and normal catalyst particle. The fines content of the polyolefin produced with such a mixture of powder and catalyst is the same as if the catalyst is made up in the absence of the polyolefin powder.

The present invention lies in a method of pretreatment of polyolefin powder which allows one to prepare the catalysts of Harris et al in the presence of the pretreated polyolefin powder to form a supported catalyst which can be used to prepare high yields of polyethylene having fewer fine particles. The pretreated polyolefin powder reacts with the catalyst components to give a homogeneous suspension. The product polymer particle size will depend on the particle size of the support powder.

The pretreatment of the polyolefin support comprises (a) mixing a solution of organomagnesium compound with a dry polyolefin powder at 0.1 to 2.0 millimoles magnesium compound per gram of powder and removing the diluent until the polyolefin powder-organomagnesium compound mixture is dry and (b) treating the powder-organomagnesium compound mixture with anhydrous hydrogen chloride at at least 2 millimoles per millimole of magnesium compound at a temperature between $-50°$ C. and the softening point of the polymer.

The pretreated polyolefin powder is now ready for the preparation of supported catalyst. A preferred method of preparing supported catalyst is to react the pretreated polyolefin in an inert diluent with a transition metal compound at mole ratios of magnesium to transition metal of 1 to 100, preferably, 2 to 20. The resulting mixture is then treated with organomagnesium compound at 1 to 10 magnesium to transition metal ratio, preferably 2 to 6 ratio and again reacting the resulting slurry with hydrogen chloride, or other deactivation agent, until no further absorption occurs.

The olefin polymerization process involves subjecting an alpha-olefin in an inert hydrocarbon medium, or in the gas phase, to polymerization conditions in the presence of a catalytic amount of the above described catalyst and sufficient organoaluminum compound to activate the catalyst and scavenge any undesirable impurities in the system.

If the polymerization is run in a hydrocarbon slurry, it is convenient, although not essential, to use the same hydrocarbon for preparing the catalyst slurry. Suitable hydrocarbons are the paraffinic and cycloparaffinic hydrocarbons having from 4 to 10 carbon atoms, such as isobutane, pentane, isopentane, hexane, heptane, octane, decane, cyclopentane, cyclohexane, methylcyclohexane and aromatic hydrocarbons, such as benzene, xylene, toluene and the like. The choice of hydrocarbon may vary with the olefin to be polymerized. The use of hydrocarbons of 6 to 10 carbon atoms will reduce the pressure required for the reaction and may be preferred for safety and equipment cost considerations.

The concentration of premixed catalyst in the hydrocarbon diluent is relatively unimportant, except to the extent that the concentration is one suitable for providing the desired catalyst concentration during the polymerization process. It is convenient to prepare catalyst slurry containing 0.01–1.5 moles of transition metal compounds per liter of slurry.

The organomagnesium compounds suitable for reducing the transition metal compounds may be the alkyl, aryl, aralkyl or alkaryl derivatives of magnesium and complexes of these with organometallic compounds of aluminum, magnesium or zinc. The reductions may be carried out at temperatures between $-100°$ C. and $125°$ C., preferably between $-30°$ and $50°$ C. Suitable alkyl derivatives are those having 1 to 20 carbon atoms such as methyl, ethyl, propyl and hexyl. The aryl derivatives may be exemplified by phenyl, tolyl, xylyl and napthyl. Examples of aralkyl groups are the benzyl and phenylethyl radicals. Especially suitable organomagnesium compounds in the invention are the organomagnesium compounds of formula RMgX, where R may be alkyl having 1 to 20 carbon atoms or aryl having 6 to 10 carbon atoms and X may be R, halogen, —OR. Complexes of organomagnesium compounds with organoaluminum compounds, such as Mg[Al(C$_2$H$_5$)$_4$]$_2$ or with ethers, such as Grignard reagents, are also especially suitable.

The deactivation agent for the excess reducing organomagnesium compound may be any of the chemical substances known to destroy or react with organomagnesium compounds. Especially suitable is anhydrous hydrogen chloride. Also suitable are hydrogen bromide, water, acetic acid, alcohols, carbonic acid, phosphorus pentachloride, silicon tetrachloride, acetylene, and mixtures thereof. Other suitable substances may be the compounds such as those discussed in "Grignard Reactions of Non-metallic Substances," by Kharrasch and Reinmuth, Prentice-Hall, 1954.

The amount of deactivation agent used depends upon the quantity of organomagnesium compound used to reduce the transition metal compound. Sufficient agent must be used to substantially destroy any excess organomagnesium compound. In the case of gaseous agents, such as hydrogen chloride, it is expedient to saturate the slurry of catalyst components with the gas when the catalyst is premixed in a catalyst reactor. Preferably, about 2 moles of deactivator per mole of magnesium compound is used to ensure the destruction of the excess organomagnesium compound.

The transition metal compounds useful in the invention may be any compound of the metals of Groups IV-B, V-B, VI-B, and VIII of the Periodic System. Typical metals of the groups are, for example, titanium, zirconium, hafnium, vanadium, niobium, tantalum, chromium, molybdenum, tungsten, iron, cobalt and nickel. Any compound of these metals such as the halides, oxyhalides, alcoholates such as the titanates of aliphatic alcohols having 1 to 6 carbon atoms in the alkyl groups, acetates, benzoates, acetylacetonates and the dicyclopentadienyl salts may be used. Especially useful are the halides and alkoxides of tetravalent titanium such as titanium tetrachloride and tetrabutyltitanate.

The activator-scavenger used in the polymerization process may be any of the organoaluminum compounds known to be useful in Ziegler polymerization systems. Especially suitable are, for example, alkylaluminums where each alkyl group has up to 16 carbon atoms, such as triethylaluminum, tri-n-propylaluminum, triisobutylaluminum, trihexylaluminum, diisobutyl aluminum hydride and mixed trialkylaluminums. Those alkyls having less than 10 carbon atoms are preferred because of the greater expense resulting from higher alkyls. Also suitable as activator are the alkyl aluminum halides and mixtures of these with aluminum alkyls.

The olefins polymerizable with the catalyst and process of this invention are those mono-olefins having 2 to 8 carbon atoms, especially ethylene, propylene, 1-butene, 1-hexene, norbornene and the like. Mixtures of ethylene with the other alphaolefins may be polymerized to give copolymers containing up to 20 percent by weight of these monoolefins.

This invention is further illustrated by, but not limited by, the following examples.

EXAMPLE 1 a. Preparation of catalyst

The substrate used was 2.29 g polyethylene powder of 10–100 micron size (SUPER DYLAN Powder - SDP-860 sold by ARCO Chemical Company). After being vacuum dried at 80° C., 2.29 g of the powder in a 25 ml flask was treated with 0.91 millimoles (mm) butyl ethyl magnesium (BuEtMg) in the minimum amount of hexane required to wet the polymer. The treated polymer was stirred in dry Argon until dry then treated with anhydrous HCl until absorption was complete. The dry powder was reslurried in 5 ml hexane then treated with 0.45 mm TiCl$_4$ for 1 hour at 40°. The slurry was then reacted with 0.91 mm BuEtMg followed by saturation with anhydrous HCl.

b. Polymerization of Ethylene

A one-gallon autoclave was evacuated and dried overnight at 100° C. to remove impurities, then cooled, and filled with N$_2$. The catalyst port was then opened and the aluminum alkyl activator and the supported catalyst slurry from 1a above were syringed into the reactor. The reactor was then closed and charged with 2 liters of isobutane at room temperature (23°–25° C.). With stirring, hydrogen was added to the desired pressure for melt index control. The reactor jacket was then heated with a steam-water mixture until the reactor was about 90° C. Ethylene was then added to 525 psig and the temperature was controlled at 93° C. After the polymerization was run for the desired time, the reactor was cooled with slow venting until no pressure was detectable on the gauge and the reactor temperature was above 20° C. The reactor was then opened; and the dry powder was scooped out of the reactor, weighed and stabilized. The air dried solids were then vacuum dried and weighed to determine yield and catalyst efficiency. The catalyst efficiency was calculated on the basis of support, Cl$_2$ and Ti. The estimated catalysts efficiencies are listed in the table.

COMPARATIVE EXAMPLE 2: (not this invention)

A catalyst was prepared in the presence of the polyethylene powder described in 1a but omitting the initial treatment with BuEtMg and HCl. Thus a slurry of 2.51 g. PE powder in 15 ml hexane in an Argon flushed 25 ml flask was treated with 0.762 mm, of butyl ethyl magnesium. After being aged 30 minutes at room temperature, 0.1525 mm of TiCl$_4$ in hexane was added. After aging 1 hour at room temperature, the mixture was treated with 1.8 mm of gaseous HCl. The final slurry was dark brown with a greenish cast. It was aged 1 hour before use. Results of polymerization of ethylene are given in the Table, also. Reversal of the order of addition of the BuEtMg and TiCl$_4$ gives a catalyst having similar properties.

COMPARATIVE EXAMPLE 3: (not this invention)

A catalyst slurry was made up in the absence of polyethylene. A catalyst was made up by reacting 4.095 mm of butyl ethyl magnesium with 0.82 mm of TiCl$_4$ in 12.9 ml hexane in a 25 ml Argon flushed flask. After being aged 30 minutes, the slurry was treated with 8.8 mm gaseous HCl. The slurry was aged 1 hour before use. It was dark brown with a slight greenish cast. Again, ethylene was polymerized with this catalyst by the procedure of Example 1b. Results are compared in the Table.

TABLE

| Catalyst | Example 1 | Comparative Example 2 | Comparative Example 3 |
|---|---|---|---|
| Yield, g PE/g Ti | 289,000 | 158,500 | 134,000 |
| Yield, g PE/g Cl | 30,700 | 13,500 | 12,200 |
| MI$_2$ | 4.6 | 5.5 | 9.4 |
| MI$_{10}$/MI$_2$ | 9.9 | 10.6 | 9.2 |

TABLE-continued

| Catalyst | Example 1 | Comparative Example 2 | Comparative Example 3 |
|---|---|---|---|
| Density P.C. | 0.967 | 0.968 | 0.969 |
| % Powder Less Than 105 microns | 2.6 | 25 | 27 |

It is clear from the results that preparing the catalyst in the presence of untreated polyethylene powder (Example 2) had no effect on the fines produced. The apparent reason is that preparation of the catalyst in the presence of untreated powder resulted in the preparation of catalyst that was independent of the PE powder. By contrast, catalyst prepared in the presence of treated powder had a high degree of interaction with the powder. Hence, fine catalyst particles, leading to polymer fines, were largely eliminated.

What is claimed is:

1. In a method for the preparation of a catalyst for the polymerization of olefins which consists of reducing a transition metal compound selected from the group consisting of the halides, oxyhalides, alcoholates of aliphatic alcohols having 1 to 6 carbon atoms in the alkyl groups, acetates, benzoates, acetylacetonates, and the dicyclopentadienyl salts, with an organomagnesium compound in the presence of a polyolefin support and then deactivating the excess organomagnesium compound with a deactivation agent therefore selected from the group consisting of hydrogen chloride, hydrogen bromide, water, acetic acid, alcohols, carbonic acid, phosphorous pentachloride, silicon tetrachloride, acetylene, and mixtures thereof; sand transition metal being selected from the metals of Groups IV-B, V-B, and VIII of the Periodic System, and said organomagnesium compound being selected from the group consisting of compounds of formula RMgX where R is alkyl having 1 to 20 carbon atoms, or aryl having 6 to 10 carbon atoms and X is R, halide or —OR and complexes of RMgX with organometallic compounds of aluminum or zinc, the improvement consisting of pretreating said polyolefin support by (a) mixing the dry polyolefin powder with 0.1 to 2.0 millimoles of an organomagnesium compound per gram of polyolefin powder and the minimum amount of an inert diluent required to wet the powder mixture, (b) removing diluent until the powder-organomagnesium compound mixture is dry, and (c) treating the powder-organomagnesium compound mixture at a temperature between $-50°$ C. and the softening point of the polymer powder with at least 2 millimoles of a deactivation agent for the magnesium compound per millimole of magnesium compound.

2. The method of claim 1 wherein said polyolefin powder is polyethylene.

3. The method of claim 1 wherein said polyolefin powder is polypropylene.

4. The method of claim 1 wherein said polyolefin powder is polyethylene, said organomagnesium compound is butyl ethyl magnesium, said inert diluent is n-hexane, and the deactivation agent is anhydrous hydrogen chloride.

* * * * *